Patented Feb. 26, 1946

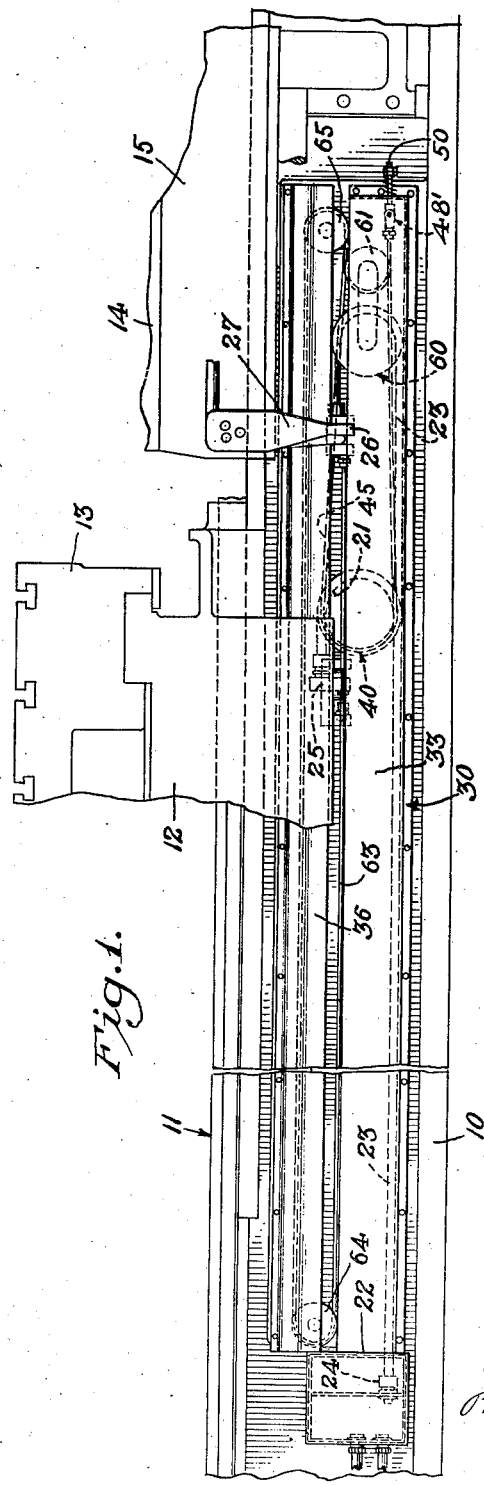

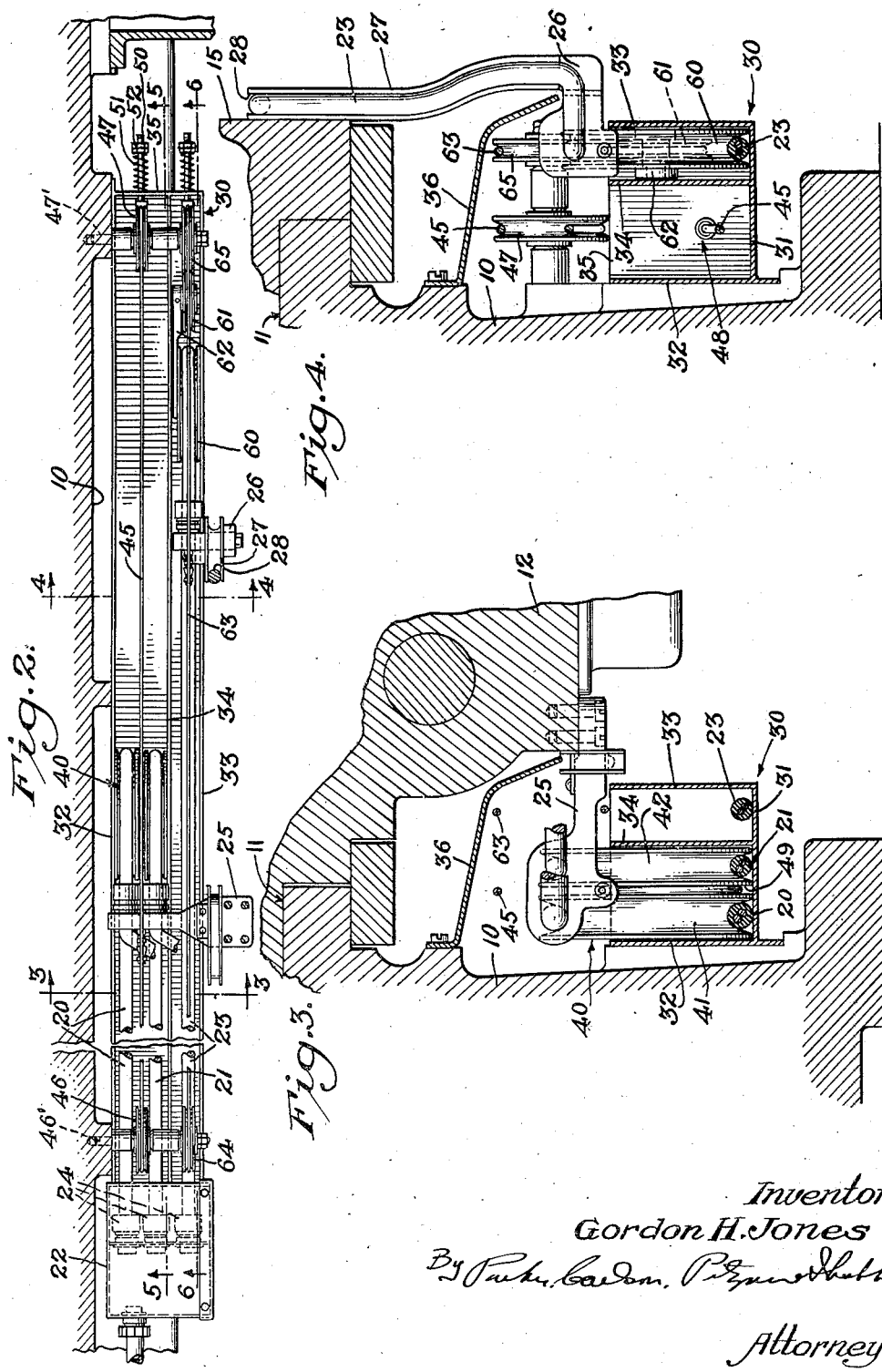

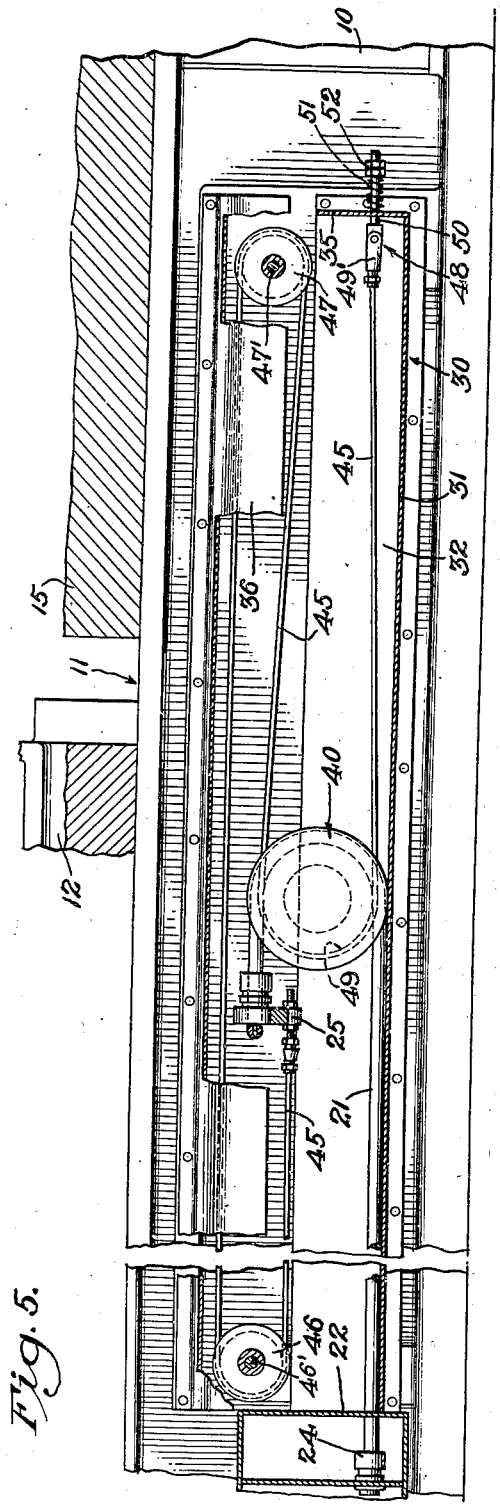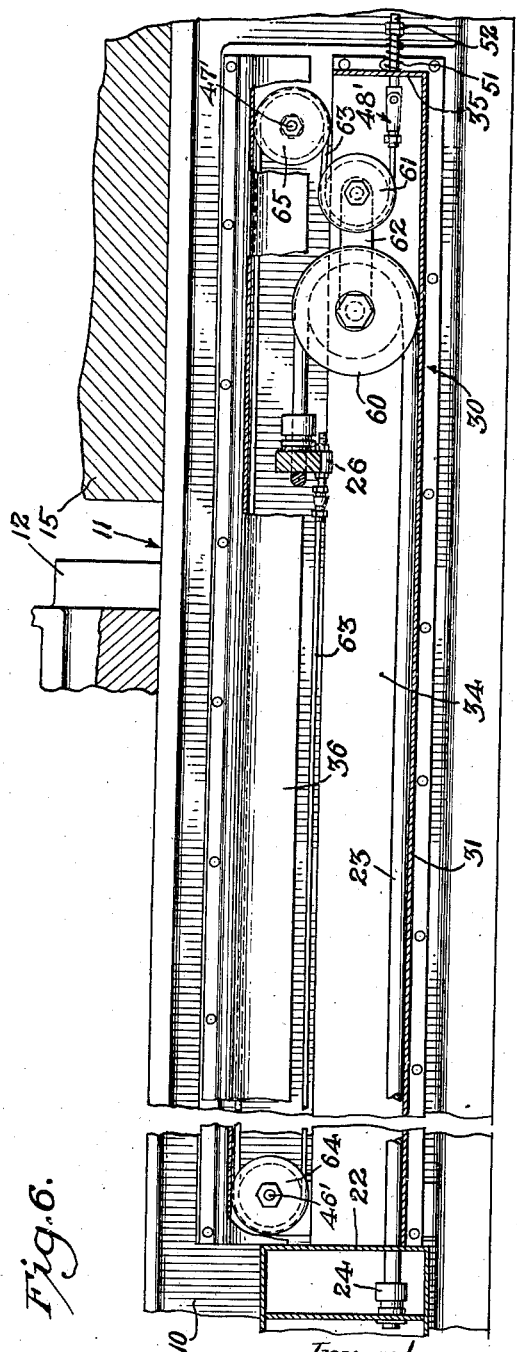

2,395,485

UNITED STATES PATENT OFFICE 2,395,485

MACHINE TOOL

Gordon H. Jones, Fond du Lac, Wis., assignor to Giddings & Lewis Machine Tool Co., Fond du Lac, Wis., a corporation of Wisconsin Application November 23, 1942, Serial No. 466,547

6 Claims. (Cl. 242—47.5)

The invention relates to machine tools generally and more particularly to improved power and control connections between the stationary and movable elements of such machines.

One object of the invention is to provide improved means for tensioning, shielding and otherwise protecting flexible conduits utilized to supply power to or to establish control connections with a machine tool element having a relatively long range of travel.

A more specific object is to provide means for taking up slack in a flexible conduit of the character above referred to and for maintaining it under sufficient tension to keep it taut without imposing the unnecessary strains thereon.

Other objects and advantages of the invention will become apparent from the following detailed description of the preferred embodiment illustrated in the accompanying drawings in which:

Figure 1 is a fragmentary rear view of a machine tool embodying the features of the invention.

Fig. 2 is a plan view of the conduit system and associated elements of the machine.

Figs. 3 and 4 are fragmentary transverse sectional views taken in vertical planes through the conduit housing substantially along the lines 3—3 and 4—4 of Fig. 2, respectively, certain details of construction being omitted for greater clarity.

Figs. 5 and 6 are longitudinal sectional views taken in vertical planes through the conduit housing substantially along the lines 5—5 and 6—6 of Fig. 2, respectively.

The features of the present invention may be embodied in various types of machine tools having a translatable carriage or the like to which a power supply or control connection is required. The invention is particularly suitable for use in large machine tools such as horizontal boring, drilling and milling machines, and has been shown herein as embodied in a machine of that type for purposes of illustration. It is to be understood, however, that the invention is not limited to the specific form disclosed but embraces all modifications, adaptations and alternative constructions falling within the spirit and scope of the appended claims.

Referring to Figs. 1, 5 and 6 of the drawings, the machine selected to illustrate the invention comprises an elongated base or bed 10 having horizontally disposed ways 11 on its upper face for slidably supporting a translatable saddle or carriage 12. The saddle carries a shiftable work table 13 for supporting work to be operated on by a tool mounted in well-known manner on a headstock column (not shown) at one end of the bed. Machines of this character are also provided with a tailstock supporting column 14 carried by a base 15 which, for purposes of adjustment, is also slidably supported on the ways 11.

The translatable carriage, columns and comparable elements of such machine tools are usually equipped with driving motors, limit switches or other controls which require a power supply or control connection with a source of power and control instrumentalities mounted on the machine frame. When electrical controls and motors are employed the connections are provided by electrical conductors which, for protection, are enclosed in flexible conduits. It will be appreciated that flexible conduits may also be used for supplying pressure fluid to hydraulic mechanism on the movable machine element and consequently the term "conduit" as used hereinafter is intended to embrace connecting means for either type of service.

In the particular machine illustrated, two conduits 20 and 21 (Figs. 2 and 3) each enclosing a plurality of electrical conductors extend from a junction box 22 to the carriage 12, and a single conduit 23 likewise enclosing a plurality of electrical conductors extends to the column base 15. The junction box 22 is bolted or otherwise rigidly secured to the bed 10 preferably on the rear wall thereof adjacent the head end of the machine. Connections are made in the junction box between the conductors of the conduits, the stationary control instrumentalities and the source of current. Each of the conduits 20, 21 and 23 is suitably anchored to the junction box at one end by a coupling device 24.

Conduits 20 and 21 are anchored at their other ends to a bracket 25 secured to the overhanging side portion of the carriage 12 and projecting inwardly toward the base as shown in Fig. 3. From this bracket, the conduits are led to the motor and other electrical elements on the carriage in any convenient manner.

Conduit 23 is anchored at its other end to a bracket 26 carried on a depending arm 27 secured to the column base 15. The arm, as herein shown, is provided with a groove 28 which forms a protecting channel through which the conduit is led to the motor or other electrical elements mounted on the column base.

To protect the conduits from mechanical injury and to shield them from oil, dirt or other foreign material, the conduits are enclosed in a housing 30 extending from the junction box 22 longitudinally of the machine bed. The housing may be constructed of sheet metal or other suitable material and as herein shown comprises a bottom plate 31, a back wall 32, a front wall 33, an intermediate wall 34 and an end wall 35. The members forming the walls are welded or otherwise joined together to form a box-like structure generally rectangular in cross section and open at the top. The rear wall member 32 may be attached to the side wall of the bed 10 in any suitable manner. A shield 36 secured to the wall of the bed is arranged to project over the housing to keep it clear of chips and other foreign material. The shield is spaced sufficiently above the top of the housing to provide clearance for the brackets 25 and 26 which are arranged above the housing as shown in Figs. 3 and 4.

Novel means is provided for taking up slack in the conduits and for maintaining them taut during movement of the machine elements and irrespective of the position of the elements on the bed. In the case of the conduits 20 and 21 leading to the carriage 12, this means comprises a sheave 40 having two relatively deep grooves 41 and 42 over which the conduits are run. The sheave is freely supported for rolling movement in the housing and is guided between the rear wall 32 and the intermediate wall 34 of the housing which thus form an elongated compartment for the conduits and the slack take up mechanism associated therewith. The conduits running over the sheave pull it along as the carriage 12 travels toward the head end of the bed, that is, to the left as viewed in Fig. 5.

The sheave 40 is continuously urged against the pull of the conduits 20 and 21 by a cable and pulley arrangement effective to roll the sheave back along its compartment in the return movement of the carriage. For this purpose, a flexible cable 45 anchored at one end to the bracket 25 is carried forwardly (to the left as viewed in Fig. 5) over a pulley 46 journaled on a shaft 46' projecting laterally from the bed 10 adjacent the junction box end of the housing 30. The cable is then led back over a pulley 47 journaled on a shaft 47' supported on the bed adjacent the other end of the housing, and then forwardly around the sheave 40 and back again to an anchoring and tensioning device 48 by which the end of the cable is anchored to the end wall 35 of the housing. As will be seen by reference to Fig. 3, the sheave 40 is provided with a narrow groove 49 for the reception of the cable 45. This groove is located between the conduit grooves 41 and 42 so as to balance the pull of both conduits and thereby counteract any tendency of the sheave to skew or twist in its compartment in the housing.

The anchoring and tensioning device 48, as herein shown, comprises a conventional cable connector 49' attached to the end of the cable 45 and pinned or otherwise secured to the head of a bolt 50 projecting through an aperture in the housing end wall 35. A coiled compression spring 51 encircling the projecting end of the bolt and interposed between the wall and a nut 52 threaded on the end of the bolt acts to maintain the cable 45 under tension. The tension on the cable and consequently the tension applied to the conduits 20 and 21 is determined solely by the tension of the spring 51 and hence is uniform irrespective of the position of the carriage on the bed. When the carriage moves to the left (as viewed in Fig. 5) or toward the head end of the bed, the conduits 20 and 21 pull the sheave 40 along in the same direction and the cable is paid out from the left end of the carriage so as not to impede the movement of the sheave. The operation is reversed in the return movement of the carriage, the cable, in this instance, serving to pull the sheave along in the direction of carriage movement while the conduits are paid out from the other side of the carriage.

Take up mechanism similar to that above described is also provided in connection with the conduit 23 extending to the column base 15. Since only one conduit is required in this instance, a sheave 60 having a single conduit groove is provided for coaction therewith. A pulley 61 is operatively connected with this sheave by means of a link 62. A cable 63 anchored to the bracket 26 on the column base, is led forwardly (to the left as viewed in Fig. 6) and over a pulley 64 rotatably supported on the shaft 46' which also supports the pulley 46 as previously described. The cable is then carried rearwardly over a second pulley 65 rotatably supported on the shaft 47', and then is led forwardly over the pulley 61 and back again to an anchoring and tensioning device 48' which serves to anchor the cable to the end wall 35 of the housing. The anchoring device 48' is similar in all respects to the anchoring device 48 previously described.

With the above arrangement, the conduit 23 and cable 63 act alternately to pull the sheave 60 along its compartment in response to the forward and return movements of the column base on the ways. Due to the action of the tensioning device, the conduit is maintained taut and under uniform tension irrespective of the position of the column base on the bed.

It will be apparent from the foregoing that the invention provides a slack take up mechanism of novel and improved construction particularly suitable for use with flexible conduits employed in supplying power to or providing control connections with movable machine parts. The mechanism effectually takes up all slack in the conduits and acts to maintain them under sufficient tension to keep them taut without imposing any unnecessary strain thereon. The tension on the conduits is uniform irrespective of the position of the movable machine parts on the supporting ways. The conduits are directed to the machine elements over sheaves of relatively large diameter thus avoiding abrupt bending and permitting the conduits to flex gradually as the machine element travels back and forth. Moreover, the conduits are fully enclosed thus protecting them from mechanical injury and shielding them from oil and grit which are detrimental to the coverings ordinarily provided for such conduits. As a result, wear on the conduits is minimized and their useful life is materially prolonged.

I claim as my invention:

1. The combination in a machine tool having a carriage or the like adapted to travel on an elongated horizontal bed, of a housing defining a compartment extending longitudinally of the bed, a free sheave in said compartment, a flexible conduit running over said sheave and anchored at opposite ends to one end of the housing and to the carriage, said conduit acting to roll the sheave along with the carriage in the movement of the latter in one direction, means operative to maintain said conduit taut in all positions of the carriage including, a flexible cable running over said sheave and over pulleys located at opposite ends of the compartment, said cable being anchored at one end to the carriage and at the opposite end to the other end of the housing whereby to roll the sheave along with the carriage in its movement in the other direction.

2. The combination in a machine tool having a carriage or the like adapted to travel on an elongated horizontal bed, of a housing defining a compartment extending longitudinally of the bed, a free sheave in said compartment, a flexible conduit running over said sheave and anchored at opposite ends to one end of the housing and to the carriage, said conduit acting to roll the sheave along with the carriage in response to movement of the carriage in one direction, means operative to maintain said conduit taut irrespective of the position of the carriage on the bed comprising, a cable anchored at opposite ends to the carriage and to the other end of the housing, and a system of pulleys including a pulley at each end of the housing and a pulley operatively connected with said sheave directing the cable so as to roll the sheave along with the carriage in response to its movement in the other direction.

3. The combination in a machine tool having a carriage or the like adapted to travel on an elongated horizontal bed, of a housing defining a compartment extending longitudinally of the bed, a free sheave in said compartment, a flexible conduit running over said sheave and anchored at opposite ends to one end of the housing and to the carriage, said conduit acting to roll the sheave along with the carriage in its movement in one direction, means operative to maintain said conduit taut irrespective of the position of the carriage on the bed comprising, pulleys secured to the housing at each end of the compartment, a pulley linked with said sheave, and a flexible cable anchored at one end to the carriage and running over said three pulleys to the other end of the compartment, and means yieldably anchoring the other end of the cable to the housing at said other end of the compartment, said anchoring means being adjustable to vary the tension applied to the cable and said conduit.

4. The combination in a machine tool having a carriage or the like adapted to travel on a horizontal bed, of a housing defining a compartment extending longitudinally of the bed, a free sheave guided to roll along said compartment, said sheave having at least three peripheral grooves, a pair of flexible conduits each anchored at one end to the housing and running over the outside grooves of said sheave to the carriage, said conduits acting to roll the sheave along the compartment in response to movement of the carriage toward the anchored ends thereof, and means operative to roll said sheave in the opposite direction in response to the return movement of the carriage including, a flexible cable running over the central groove of said sheave and over pulleys disposed at opposite ends of the compartment, said cable being anchored at one end to the carriage and at the other end to said housing at the end thereof remote from the end to which said conduits are anchored.

5. The combination in a machine tool having a carriage or the like adapted to travel on a horizontal bed, of a housing defining a compartment extending longitudinally of the bed, a free sheave guided to roll along said compartment, said sheave having at least three peripheral grooves, a pair of flexible conduits each anchored at one end to the housing and running over the outside grooves of said sheave to the carriage, said conduits acting to roll the sheave along the compartment in response to movement of the carriage toward the anchored ends thereof, means operative to maintain said conduits under uniform tension irrespective of the position of the carriage on the bed including, a cable anchored at one end to the carriage and running over pulleys at opposite ends of the housing and over the central groove of said sheave to the other end of the compartment, and means yieldably anchoring the other end of said cable to said housing, said anchoring means being adjustable to vary the tension applied through the cable to said conduits.

6. In a machine tool, in combination, an elongated horizontal bed, a carriage reciprocable on said bed, a housing defining a compartment extending longitudinally of said bed, a junction box at one end of said housing, a conduit extending from said junction box to said carriage, take-up mechanism mounted in and movable along said housing for taking up the slack in said conduit as the carriage travels along said bed, means acting on said mechanism to maintain said conduit taut in all positions of the carriage including a flexible cable operatively connected to said mechanism and anchored at its ends to said carriage and to the end of said bed opposite said junction box respectively, and pulleys supported at opposite ends of said housing, said cable being carried over both of said pulleys.

GORDON H. JONES.